US011171436B1

(12) United States Patent
    Lou

(10) Patent No.: US 11,171,436 B1
(45) Date of Patent: Nov. 9, 2021

(54) BATTERY CONNECTOR

(71) Applicant: LOTES CO., LTD, Keelung (TW)

(72) Inventor: Pei Yu Lou, Keelung (TW)

(73) Assignee: LOTES CO., LTD, Keelung (TW)

( * ) Notice: Subject to any disclaimer, the term of this patent is extended or adjusted under 35 U.S.C. 154(b) by 0 days.

(21) Appl. No.: 17/012,233

(22) Filed: Sep. 4, 2020

(30) Foreign Application Priority Data

May 27, 2020 (CN) .......................... 202010461241.1

(51) Int. Cl.
| H01R 13/24 | (2006.01) |
| H01R 12/55 | (2011.01) |
| H01R 33/18 | (2006.01) |
| H01M 50/216 | (2021.01) |
| H01R 103/00 | (2006.01) |
| H01M 50/543 | (2021.01) |

(52) U.S. Cl.
CPC .......... *H01R 13/24* (2013.01); *H01M 50/216* (2021.01); *H01R 12/55* (2013.01); *H01R 33/18* (2013.01); *H01M 50/543* (2021.01); *H01R 2103/00* (2013.01)

(58) Field of Classification Search
CPC ........ H01R 13/24; H01R 12/55; H01R 33/18; H01R 2103/00; H01M 50/216; H01M 50/543
See application file for complete search history.

(56) References Cited

U.S. PATENT DOCUMENTS

| 6,603,670 B1* | 8/2003 | Chien ................. H01M 50/216 361/801 |
| 10,270,070 B2* | 4/2019 | Cadio ................. H01M 50/216 |
| 2002/0022399 A1* | 2/2002 | Ninomiya ........... H01M 50/216 439/500 |
| 2009/0017674 A1* | 1/2009 | Chen ................. H01R 13/2442 439/500 |
| 2009/0148757 A1* | 6/2009 | Zhang ................. H01M 50/543 429/100 |

FOREIGN PATENT DOCUMENTS

| CN | 106921065 A | 7/2017 |
| TW | 343789 U | 10/1998 |
| TW | 458389 U | 10/2001 |
| TW | 520786 U | 2/2003 |

* cited by examiner

*Primary Examiner* — Tho D Ta
(74) *Attorney, Agent, or Firm* — Locke Lord LLP; Tim Tingkang Xia, Esq.

(57) ABSTRACT

A battery connector is disclosed. An insulating body has a first accommodating space and a limiting portion, and a second accommodating space, which is in communication with the first accommodating space, is provided above the first accommodating space and the limiting portion. In assembly, the battery is guided downward into the second accommodating space, and the battery is pressed downward such that the battery passes the limiting portion to enter the first accommodating space and abut a positive pole terminal and a negative pole terminal, thus achieving assembly of the battery conveniently, and effectively preventing the battery from falling out of the insulating body.

19 Claims, 9 Drawing Sheets

A-A

B-B

BATTERY CONNECTOR

CROSS-REFERENCE TO RELATED PATENT APPLICATION

This non-provisional application claims priority to and the benefit of, pursuant to 35 U.S.C. § 119(a), patent application Serial No. CN202010461241.1 filed in China on May 27, 2020. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a battery connector, and particularly to a battery connector convenient for automatic assembly.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A battery connector has an overall structure which occupies a small space and provides stable current, and is often installed in an electronic apparatus such as a computer or a server to provide an additional power source or a supplemental power source. Generally, a battery connector includes an insulating body having a battery accommodated therein, a limiting portion located at a top portion of the insulating body and being block-shaped to stop the battery from detaching from the insulating body, and a positive pole terminal and a negative pole terminal retained in the insulating body and abutting the battery. In an assembling process of the conventional modern battery connector, the positive pole terminal and the negative pole terminal are generally pre-installed in the insulating body. Then, a device, such as a robotic arm, is used to grab the battery and to place it downward on the stopping portion, and another device is used to press the battery downward, such that the battery passes the limiting portion and abuts the positive pole terminal and the negative pole terminal, thereby completing the assembly of the battery connector. However, the battery has a relatively small structure, and in the process of the robotic arm rapidly placing the battery onto the insulating body, it is difficult for the whole battery to just align with and abut the top of the limiting portion. Generally, the battery partially abuts the limiting portion and partially protrudes out of the insulating body. Thus, the battery may easily impact with the stopping surface of the limiting portion and falls out of the insulating body when being placed therein. Alternatively, in the subsequent process of pressing the battery, the force applied to the battery at its two sides may be unbalanced due to the battery partially protruding out of the insulating body, which causes the battery to fall out of the insulating body or not to be installed in the accurate location, thereby increasing the defect rate of the products, and increasing the human and production costs.

Therefore, a heretofore unaddressed need to design a new battery connector exists in the art to address the aforementioned deficiencies and inadequacies.

SUMMARY

The present invention is directed to a battery connector, which is provided with a second accommodating space above a first accommodating space and a limiting portion in the insulating body, and the second accommodating space is in communication with the first accommodating space. Thus, the battery is firstly accommodated in the second accommodating space, and is then pressed downward through the second accommodating space to pass the limiting portion and enter the first accommodating space, thus abutting the positive pole terminal and the negative pole terminal, thereby achieving the assembly of the battery conveniently, and effectively preventing the battery from falling out of the insulating body.

To achieve the foregoing objective, the present invention adopts the following technical solutions. A battery connector is configured to be electrically connected to a battery, and includes: an insulating body, having a bottom wall, a side wall extending upward from a surrounding periphery of the bottom wall and a plurality of stopping walls formed by extending upward from the side wall, wherein the bottom wall and the side wall form a first accommodating space altogether, the side wall is provided with at least one limiting portion protruding inward, the insulating body has a second accommodating space above the limiting portion, the second accommodating space is enclosed by the stopping walls, and the second accommodating space and the first accommodating space are in communication with each other; and a positive pole terminal and a negative pole terminal, respectively fixed to the insulating body and entering the first accommodating space; wherein the battery is mounted downward into the second accommodating space and passes the limiting portion to enter the first accommodating space, the battery respectively abuts the positive pole terminal and the negative pole terminal, and the limiting portion stops a top end of the battery to limit the battery from moving upward.

In certain embodiments, the positive pole terminal is protrudingly provided with a protruding portion, the protruding portion and the limiting portion are located on a same horizontal plane, and the second accommodating space is located above the protruding portion.

In certain embodiments, the side wall is ring shaped, the side wall is provided with two limiting portions, and the two limiting portions are respectively located at two opposite sides of the negative pole terminal, the two limiting portions are equally distanced from the positive pole terminal, and are located on the same horizontal plane with the protruding portion.

In certain embodiments, the positive pole terminal has a abutting portion abutting the battery and an extending portion extending upward from the abutting portion, the protruding portion is formed by punching the extending portion, the protruding portion and an abutting surface of the abutting portion are located at a same side, two opposite side edges of the protruding portion are connected with the extending portion, and a bottom end of the protruding portion limits the battery from moving upward.

In certain embodiments, the bottom end of the protruding portion is a hollow structure, the bottom end of the protruding portion is broken from the extending portion, such that the extending portion forms a breaking hole.

In certain embodiments, the positive pole terminal comprises a pressing portion extending upward from a top end of the extending portion, the pressing portion has an oblique section inclined toward a direction away from the second accommodating space, and an upright section extending upward from the oblique section, and the oblique section is at least partially located in the second accommodating space.

In certain embodiments, the positive pole terminal further comprises a first section and a second section opposite to each other and collectively forming a U-shaped structure, and a first soldering leg formed by tearing from the first section, the first section is provided with the abutting portion and the extending portion, the insulating body is provided with an accommodating hole accommodating the first section, the side wall is provided with a first fixing slot in an inner wall surface of the accommodating hole, the second section is fixed to the first fixing slot, and an extending height of the second section does not pass beyond a height of a connecting location of the extending portion and the oblique section.

In certain embodiments, an inner wall surface of each of the stopping walls is provided with a guide surface extending obliquely downward.

In certain embodiments, a top portion of the limiting portion has a first oblique surface obliquely extending downward, a top portion of each of the stopping walls has a second oblique surface obliquely extending downward toward the second accommodating space, the guide surface is located between the first oblique surface and the second oblique surface, and an inclined angle of the guide surface is greater than an inclined angle of the first oblique surface.

In certain embodiments, the side wall is provided with a second fixing slot to fix the negative pole terminal, a first notch is located above and in communication with the second fixing slot, a second notch is located between two adjacent ones of the stopping walls and extends downward to the side wall, and a depth of the first notch recessing downward is less than a depth of the second notch recessing downward.

In certain embodiments, the negative pole terminal comprises a mounting portion extending upward and fixed to the side wall, and two contact arms extending toward the first accommodating space from the mounting portion and abutting the battery, a second soldering leg is located between the two contact arms, the second soldering leg comprises a lateral section extending toward the first accommodating space from a surface of the mounting portion and in contact with the bottom wall, and a vertical section bending and extending downward from a tail end of the lateral section and passing through the bottom wall.

A battery connector is configured to be electrically connected to a battery, and includes: an insulating body, having a first accommodating space and a second accommodating space located above the first accommodating space, the second accommodating space is enclosed by a plurality of stopping walls, the second accommodating space and the first accommodating space are in communication with each other, at least one limiting portion is provided between the first accommodating space and the second accommodating space, a top portion of the limiting portion is connected to one of the stopping walls, and the stopping walls are located above the limiting portion; and a positive pole terminal and a negative pole terminal, respectively fixed to the insulating body and entering the first accommodating space; wherein the battery is mounted downward into the second accommodating space and passes the limiting portion to enter the first accommodating space, the battery respectively abuts the positive pole terminal and the negative pole terminal, and the limiting portion stops a top end of the battery to limit the battery from moving upward.

In certain embodiments, the insulating body has a bottom wall and a side wall extending upward from a surrounding periphery of the bottom wall, the bottom wall and the side wall form the first accommodating space altogether, and the limiting portion is provided to protrude inward from the side wall.

In certain embodiments, an inner wall surface of each of the stopping walls is provided with a guide surface extending obliquely downward.

In certain embodiments, the positive pole terminal has a protruding portion extending inward, the protruding portion and the limiting portion are located on a same horizontal plane, and the second accommodating space is located above the protruding portion.

In certain embodiments, the positive pole terminal and the negative pole terminal are provided opposite to each other, the side wall is provided with two limiting portions, the positive pole terminal has a abutting portion abutting the battery and an extending portion extending upward from the abutting portion, a protruding portion is formed by punching the extending portion, the protruding portion and an abutting surface of the abutting portion are located at a same side, two opposite side edges of the protruding portion are connected with the extending portion, and the two limiting portions are respectively located at two opposite sides of the negative pole terminal and are located on the same horizontal plane with the protruding portion.

A battery connector is configured to be electrically connected to a battery, and includes: an insulating body, having a first accommodating space, wherein a side wall surface of the first accommodating space is provided with at least one limiting portion protruding inward; and a positive pole terminal and a negative pole terminal, respectively fixed to the insulating body and entering the first accommodating space; wherein a thickness of the battery is less than a distance between a bottom surface of the limiting portion and a top end of the insulating body, the battery is mounted downward into the insulating body and has an initial position and a final position, when the battery is located at the initial position, the battery is located above the limiting portion, when the battery is located at the final position, the battery is located below the limiting portion to respectively abut the positive pole terminal and the negative pole terminal, and the limiting portion stops a top end of the battery; wherein the insulating body has a bottom wall and a side wall extending upward from a surrounding periphery of the bottom wall, the bottom wall and the side wall form the first accommodating space altogether, the insulating body has a second accommodating space above the limiting portion, the second accommodating space is enclosed by a plurality of stopping walls, the stopping walls are formed by extending upward from the side wall, and when the battery is located at the initial position, the battery is accommodated in the second accommodating space.

In certain embodiments, when the battery is located at the initial position, the stopping walls and at least one side of the battery are in contact with each other.

In certain embodiments, the positive pole terminal and the negative pole terminal are provided opposite to each other, the side wall is provided with two limiting portions, the positive pole terminal has a abutting portion abutting the battery and an extending portion extending upward from the abutting portion, a protruding portion is formed by punching the extending portion, the protruding portion and an abutting surface of the abutting portion are located at a same side, two opposite side edges of the protruding portion are connected with the extending portion, and the two limiting portions are respectively located at two opposite sides of the negative pole terminal and are located on the same horizontal plane with the protruding portion.

Compared with the related art, certain embodiments of the present invention have the following beneficial effects. The second accommodating space is provided above the first accommodating space and the limiting portion in the insulating body, and the second accommodating space is in communication with the first accommodating space. In assembly, the battery is firstly guided downward into the second accommodating space. Then, the battery is pressed downward to pass the limiting portion and enter the first accommodating space, thus abutting the positive pole terminal and the negative pole terminal. Thus, in the process of placing the battery, even if the battery is not mounted into and aligned with the insulating body, the battery will be firstly guided into the second accommodating space in the downward mounting process and located above the limiting portion, such that the battery is mounted into the insulating body without being ejected out, thus ensuring the battery is guided by the inner wall surface of the second accommodating space in the subsequent pressing process to smoothly pass the limiting portion and enter the first accommodating space to stably abut the positive pole terminal and the negative pole terminal in the first accommodating space, and enhancing the assembly yield rate of the battery connector.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
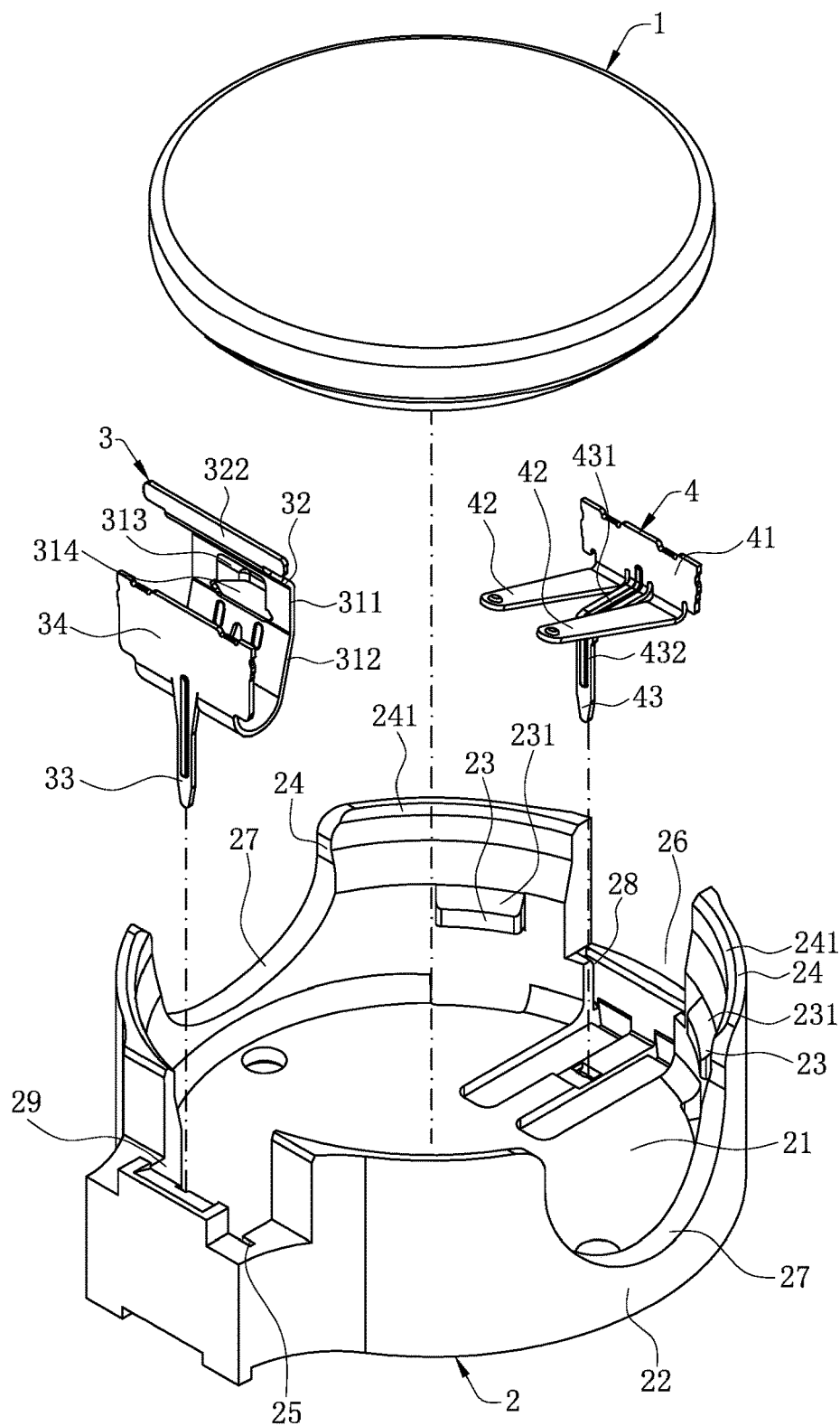
FIG. 1 is a perspective exploded view of a battery connector according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "center," "upper" or "top," "lower" or "bottom," "left," "right," "vertical," "horizontal," "inner" or "outer" may be used herein to describe one element's directional or positional relationship to another element as illustrated in the Figures. It will be understood that the relative terms are used to describe the features of certain embodiments of the invention, and not to indicate or imply a required directional or positional relationship between the elements. Thus, the relative terms are not intended to limit the scope of all aspects of the invention. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-8. In accordance with the purposes of this invention, as embodied and broadly described herein, this invention, in one aspect, relates to a battery connector.

Figure 2:
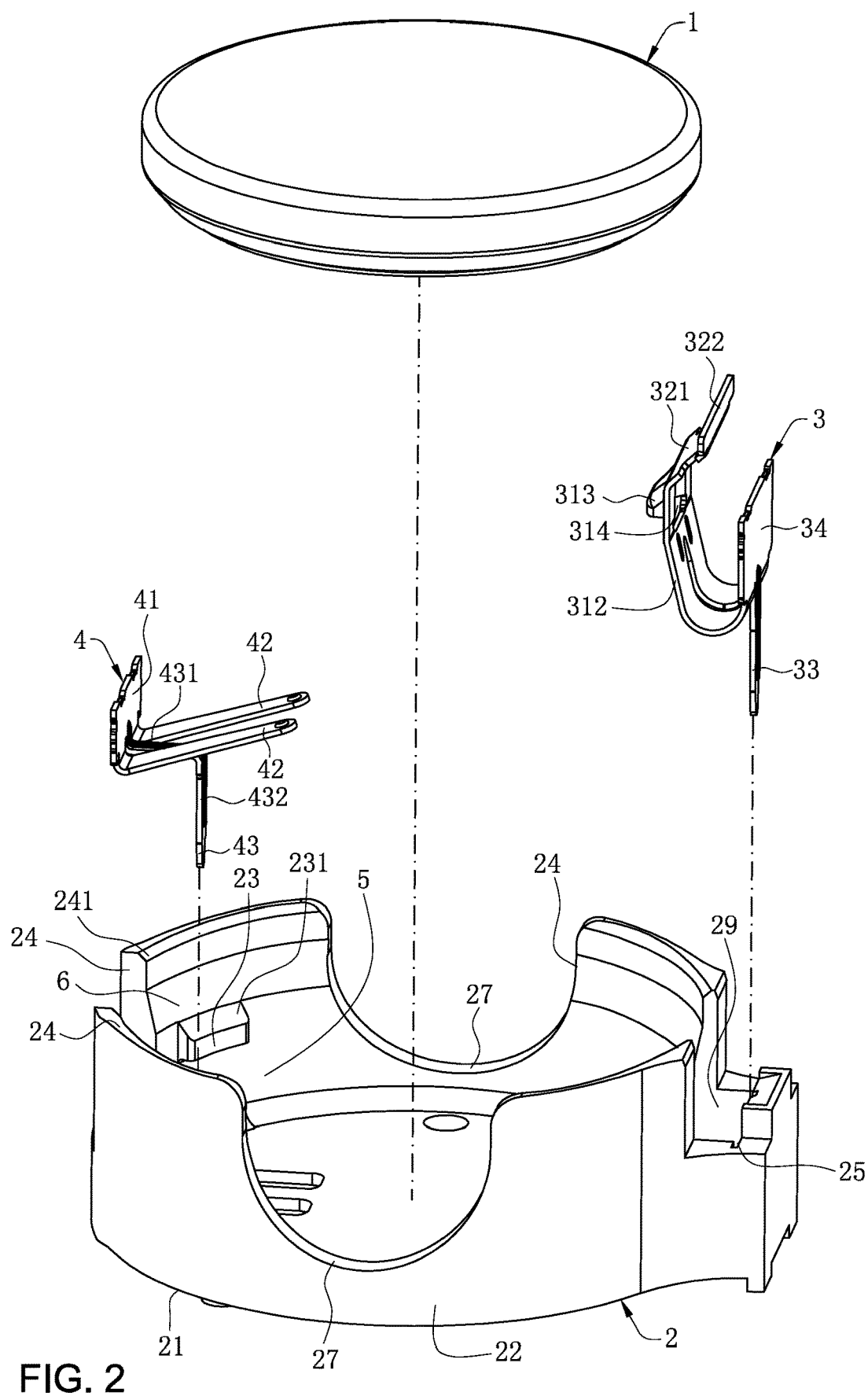
FIG. 2 is a perspective exploded view of the battery connector from another viewing angle according to certain embodiments of the present invention.
Figure 3:
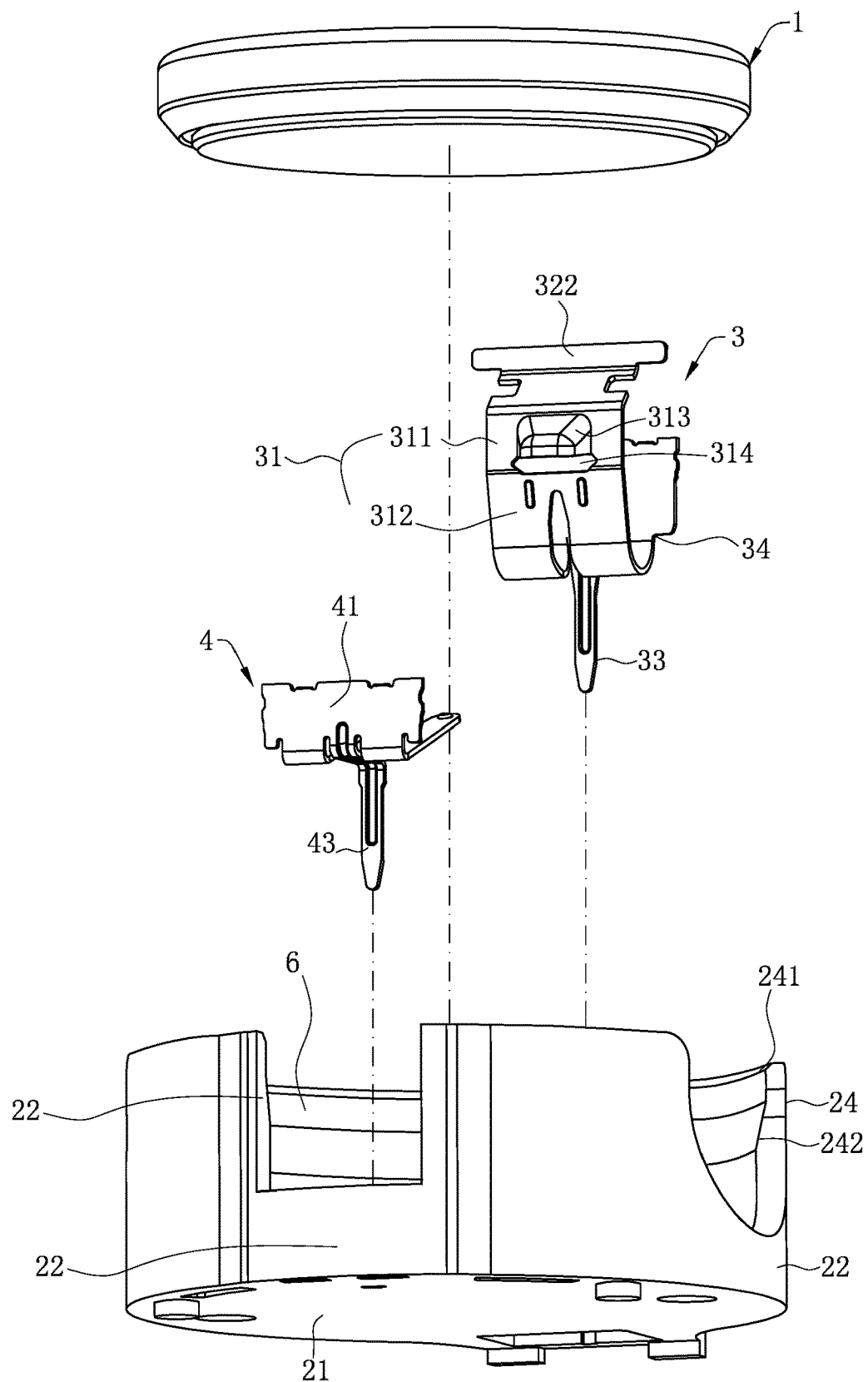
FIG. 3 is a perspective exploded view of FIG. 2 along another viewing angle.

As shown in FIG. 1, FIG. 2 and FIG. 3, the battery connector 100 according to certain embodiments of the present invention is a button-type battery connector 100, which is used to be electrically connected to a button-type battery 1. The battery connector 100 includes an insulating body 2, a positive pole terminal 3 and a negative pole terminal 4. In certain embodiments, the battery connector 100 may be a battery connector 100 with other structures, which is not limited herein.

Figure 6:
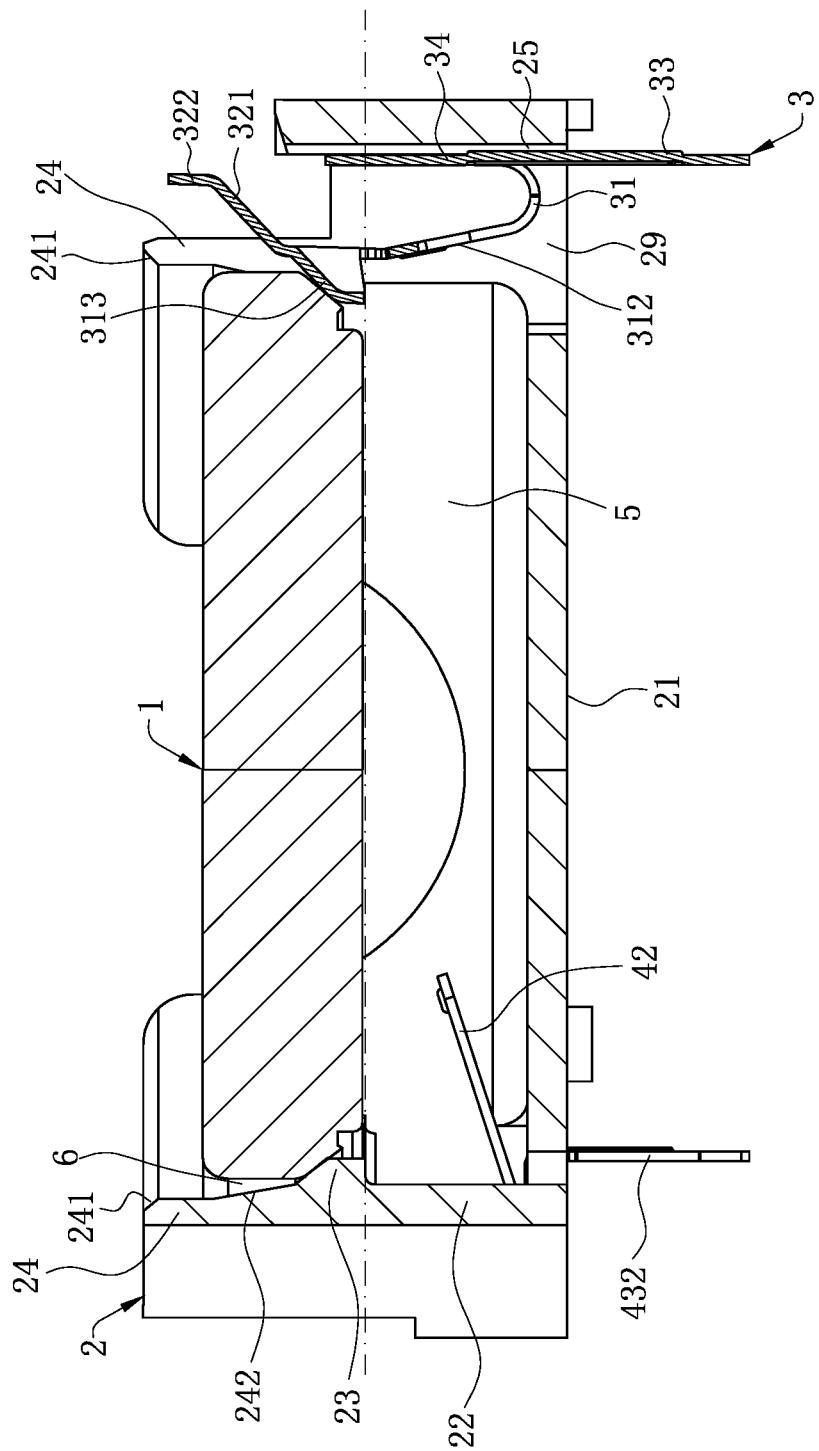
FIG. 6 is a sectional view of FIG. 5 along line A-A.
Figure 9:
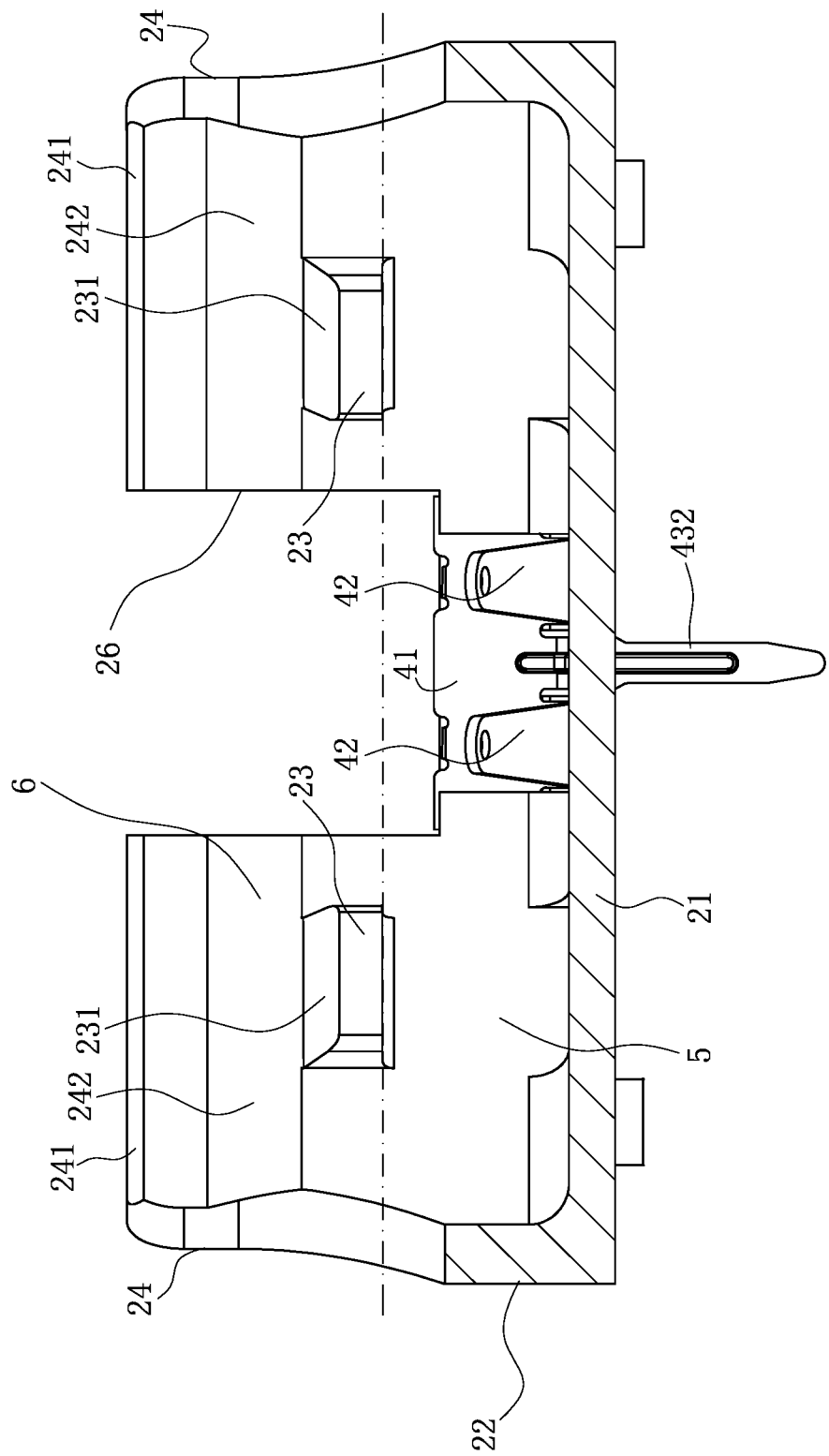
FIG. 9 is a sectional view of FIG. 8 along line B-B.

As shown in FIG. 1, FIG. 6, FIG. 7 and FIG. 9, the insulating body 2 is formed by a bottom wall 21 and a side wall 22 extending upward from a surrounding periphery of the bottom wall 21, and the side wall 22 is ring shaped. The bottom wall 21 and the side wall 22 form a first accommodating space 5 altogether to accommodate the battery 1. The side wall 22 is provided with two block-shaped limiting portions 23 protruding inward. The two limiting portions 23 are located above the battery 1 to stop a top end of the battery 1 and to limit the battery 1 from moving upward. In other embodiments, only one limiting portion 23 or multiple limiting portions 23 may be provided based on the need. Further, four stopping walls 24 are formed by extending upward from the side wall 22. That is, in this embodiment, the side wall 22 and the stopping walls 24 are integrally formed, and the top end of the side wall 22 are protrudingly provided with the four stopping walls 24 at intervals. In other embodiments, the stopping walls 24 may be formed separately from the side wall 22 and then assembled to the side wall 22, and one stopping wall 24 or multiple stopping walls 24 may be provided, without being limited thereto. The stopping walls 24 are all located above the limiting portions 23, and the stopping walls 24 altogether enclose to form a second accommodating space 6 for the battery 1 to be mounted therein. The first accommodating space 5 and the second accommodating space 6 are in communication with each other, and a thickness of the battery 1 is equal to a distance between a top surface of each of the limiting portions 23 and a top end of the insulating body 2. In other embodiments, the thickness of the battery 1 may be less than the distance between the top surface of each of the limiting portions 23 and the top end of the insulating body 2. The dotted line as shown in each of FIG. 6 and FIG. 9 is a virtual boundary line of a bottom surface of each of the limiting portions 23. As shown in FIG. 6, the thickness of the battery 1 is less than a distance between the bottom surface of each of the limiting portions 23 and the top end of the insulating body 2. In addition, the top portion of each of the limiting portions 23 has a first oblique surface 231 obliquely extending downward to allow the battery 1 to pass the limiting portions 23 downward to enter the first accommodating space 5. A top portion of each of the stopping walls 24 has a second oblique surface 241 obliquely extending downward toward the second accommodating space 6, and the second oblique surface 241 is used to guide the battery 1 to be mounted into the second accommodating space 6. An inner wall surface of each of the stopping walls 24 is provided with a guide surface 242 extending obliquely downward to guide the battery 1 to stably enter the first accommodating space 5. In this embodiment, the guide surface 242 is located between the first oblique surface 231 and the second oblique surface 241, and a vertical surface is connected between the second oblique surface 241 and the guide surface 242. The guide surface 242 is located above the limiting portions 23 and is connected to the top surface of a corresponding limiting portion 23. In this embodiment, an inclined angle of the guide surface 242 is greater than an inclined angle of the first oblique surface 231, which allows the battery 1 to be placed horizontally in the second accommodating space 6. Further, in this embodiment, the top portion of the side wall 22 is provided with a first fixing slot 25 to retain the positive pole terminal 3 and a second fixing slot 28 to retain the negative pole terminal 4. A first notch 26 is located above and in communication with the second fixing slot 28, and the first notch 26 is located between two adjacent stopping walls 24. A second notch 27 is located between two adjacent stopping walls 24 and extends downward to the side wall 22. A depth of the first notch 26 recessing downward is less than a depth of the second notch 27 recessing downward.

In this embodiment, as shown in FIG. 1, FIG. 2, FIG. 3 and FIG. 7, the side wall 22 is provided with an accommodating hole 29 to accommodate the positive pole terminal 3. The accommodating hole 29 is located between two adjacent stopping walls 24 and opposite to the first notch 26. The positive pole terminal 3 includes a pressing portion 32, a first section 31 and a second section 34 opposite to each other, and a first soldering leg 33 formed by tearing from the first section 31, The first section 31 and the second section 34 collectively form a U-shaped structure. The first section 31 is accommodated in the accommodating hole 29, and the first fixing slot 25 is adjacent and communicate with the accommodating hole 29. The first section 31 is inclined toward the first accommodating space 5 and enters the first accommodating space 5. The first section 31 is provided with an extending portion 311 and an abutting portion 312 abutting and conductively connected to one side of the battery 1. In this embodiment, the abutting portion 312 abuts the battery 1 by providing a protrusion. The extending portion 311 extends upward from the abutting portion 312. The pressing portion 32 extends upward from a top end of the extending portion 311. Further, a protruding portion 313 is formed by punching the extending portion 311. The protruding portion 313 and an abutting surface of the abutting portion 312 are located at a same side. Two opposite side edges of the protruding portion 313 are connected with the extending portion 311, and a bottom end of the protruding portion 313 is a hollow structure. The bottom end of the protruding portion 313 is broken from the extending portion 311, such that the extending portion 311 forms a breaking hole 314, and the bottom end of the protruding portion 313 limits the battery 1 from moving upward. Further, an inclined angle of the top surface of the protruding portion 313 is equal to an inclined angle of the second oblique surface 241, such that the two ends of the battery 1 may be placed on the limiting portions 23 and the protruding portion 313 in a relatively balanced way. The pressing portion 32 has an oblique section 321 inclined toward a direction away from the second accommodating space 6, and an upright section 322 extending upward from the oblique section 321. The two sides of the upright section 322 respectively abut the outer sides of two stopping walls 24 to prevent the first section 31 from being excessively inclined. In this embodiment, the oblique section 321 is partially located in the second accommodating space 6. In other embodiments, the oblique section 321 may be completely located in the second accommodating space 6. The second section 34 is accommodated in the first fixing slot 25 to fix the positive pole terminal 3 to the insulating body 2. In addition, an extending height of the second section 34 does not pass beyond a height of a connecting location of the first section 31 and the pressing portion 32, such that the pressing portion 32 has sufficient space to move in a front-rear direction without being abutted. The first soldering leg 33 passes through the bottom wall 21 to be soldered and fixed to an electronic component (not shown in the drawings).

Figure 8:
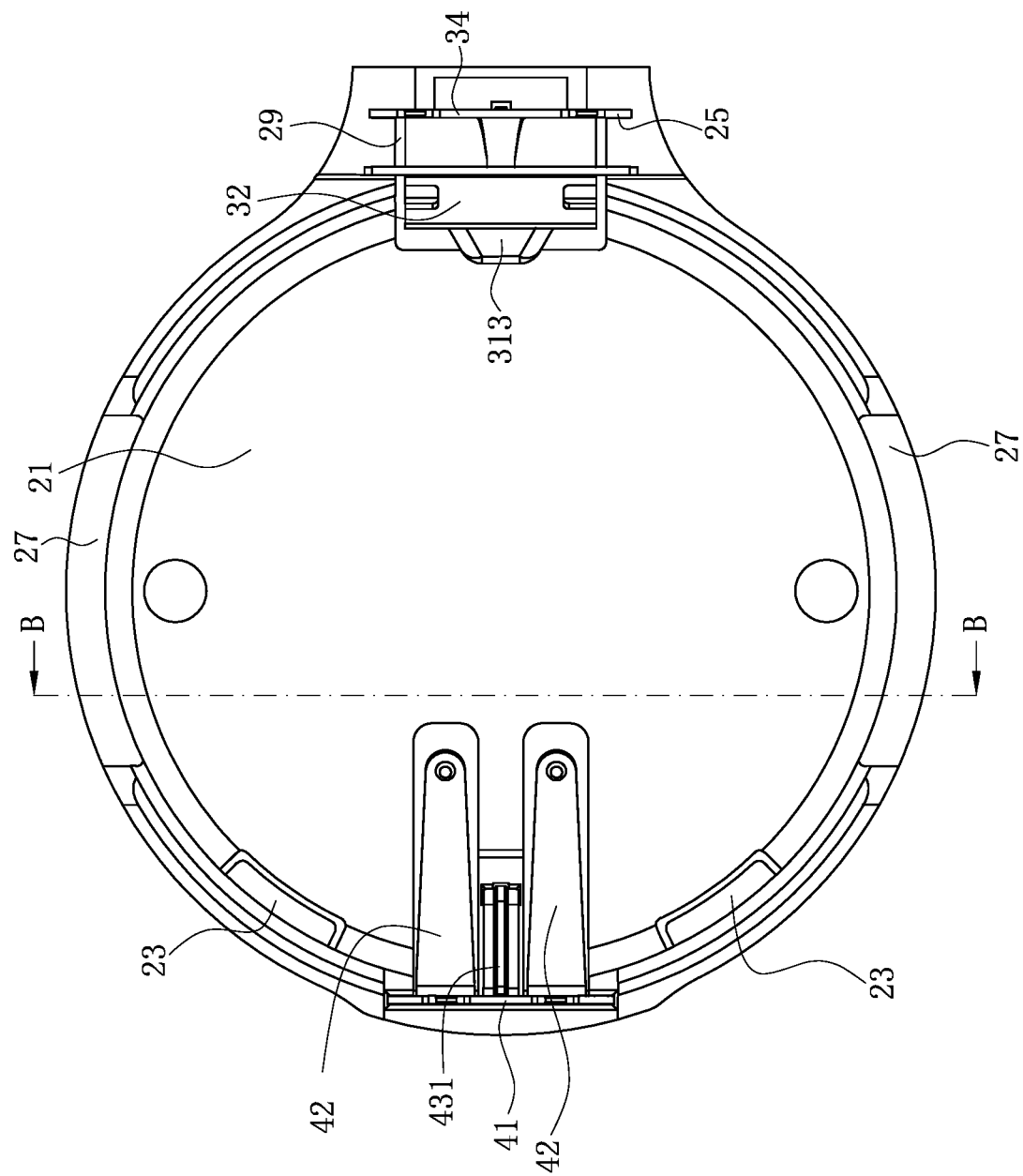
FIG. 8 is a top view of the positive pole terminal and the negative pole terminal mounted on the insulating body according to certain embodiments of the present invention.

As shown in FIG. 1, FIG. 2 and FIG. 8, the negative pole terminal 4 includes a mounting portion 41 extending upward and retained in the second fixing slot 28. That is, the negative pole terminal 4 is located between two stopping wall 24. Further, the negative pole terminal 4 includes two contact arms 42 extending toward the first accommodating space 5 from the surface of the mounting portion 41, and the two contact arms 42 abut the bottom end of the battery 1. The surfaces of the two contact arms 42 are formed with protrusion dots to further facilitate contact with the battery 1. A second soldering leg 43 is located between the two contact arms 42. The second soldering leg 43 includes a lateral section 431 extending toward the first accommodating space 5 from the surface of the mounting portion 41 and in contact with the bottom wall 21, and a vertical section 432 bending and extending downward from a tail end of the lateral section 431 and passing through the bottom wall 21 (that is, the second soldering leg 43 is formed as an inversed L shape). The vertical section 432 is soldered and fixed to an electronic component, and the surfaces of the lateral section 431 and the vertical section 432 have protrusions. In addition, the two limiting portions 23 are respectively located below the two stopping walls 24 at the two opposite sides of the negative pole terminal 4, and the two limiting portions 23 are equally distanced from the positive pole terminal 3, The two limiting portions 23 and the protruding portion 313 are provided opposite to each other to stop the top end of the battery 1 altogether, thus limiting the battery 1 from moving upward. Further, the two limiting portions 23 and the protruding portion 313 are located on a same horizontal plane, such that the battery 1 may enter the first accommodating space 5 downward more stably.

For convenience of understanding, the mounting of the battery 1 into the insulating body 2 according to certain embodiments of the present invention will be described hereinafter.

Figure 4:
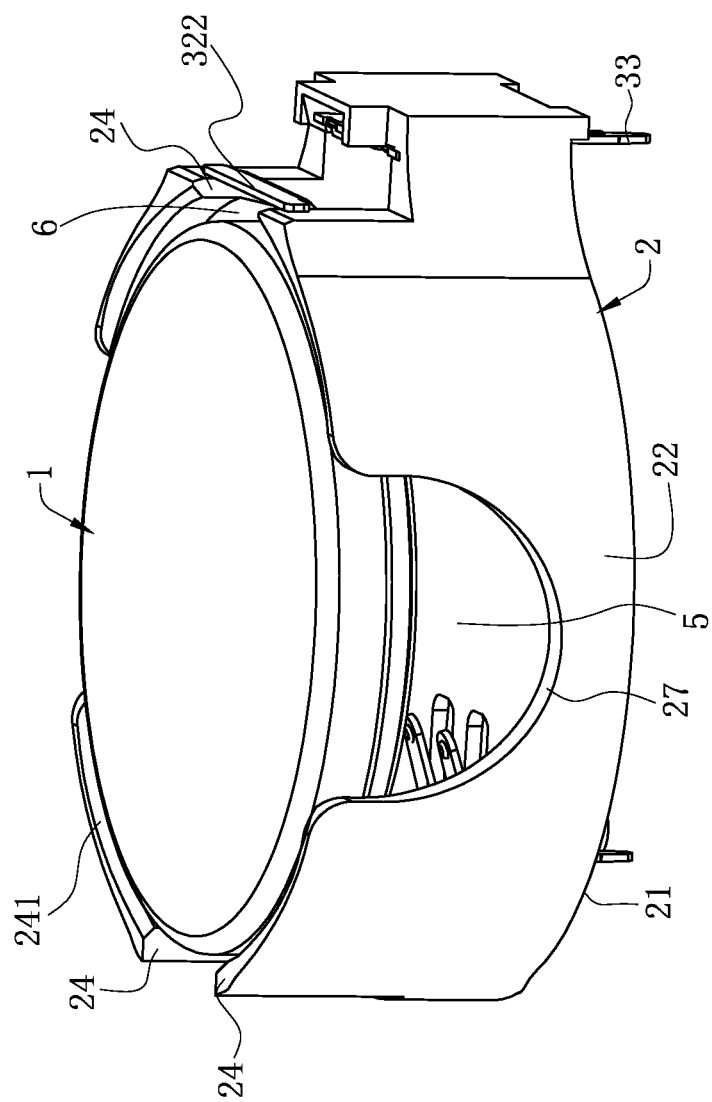
FIG. 4 is a perspective view of the battery mounted in the second accommodating space according to certain embodiments of the present invention.
Figure 5:
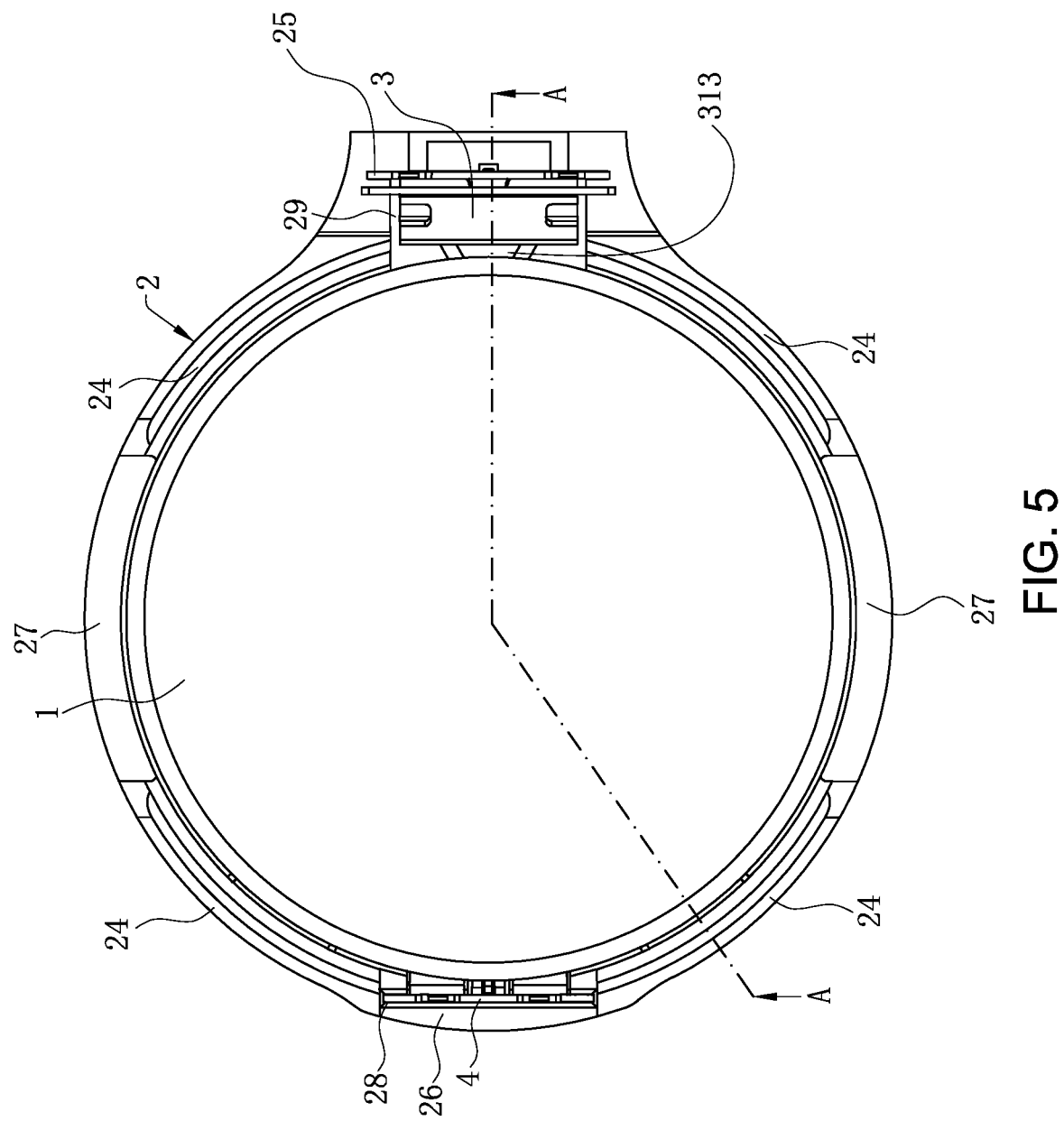
FIG. 5 is a top view of the battery mounted in the second accommodating space according to certain embodiments of the present invention.
Figure 7:
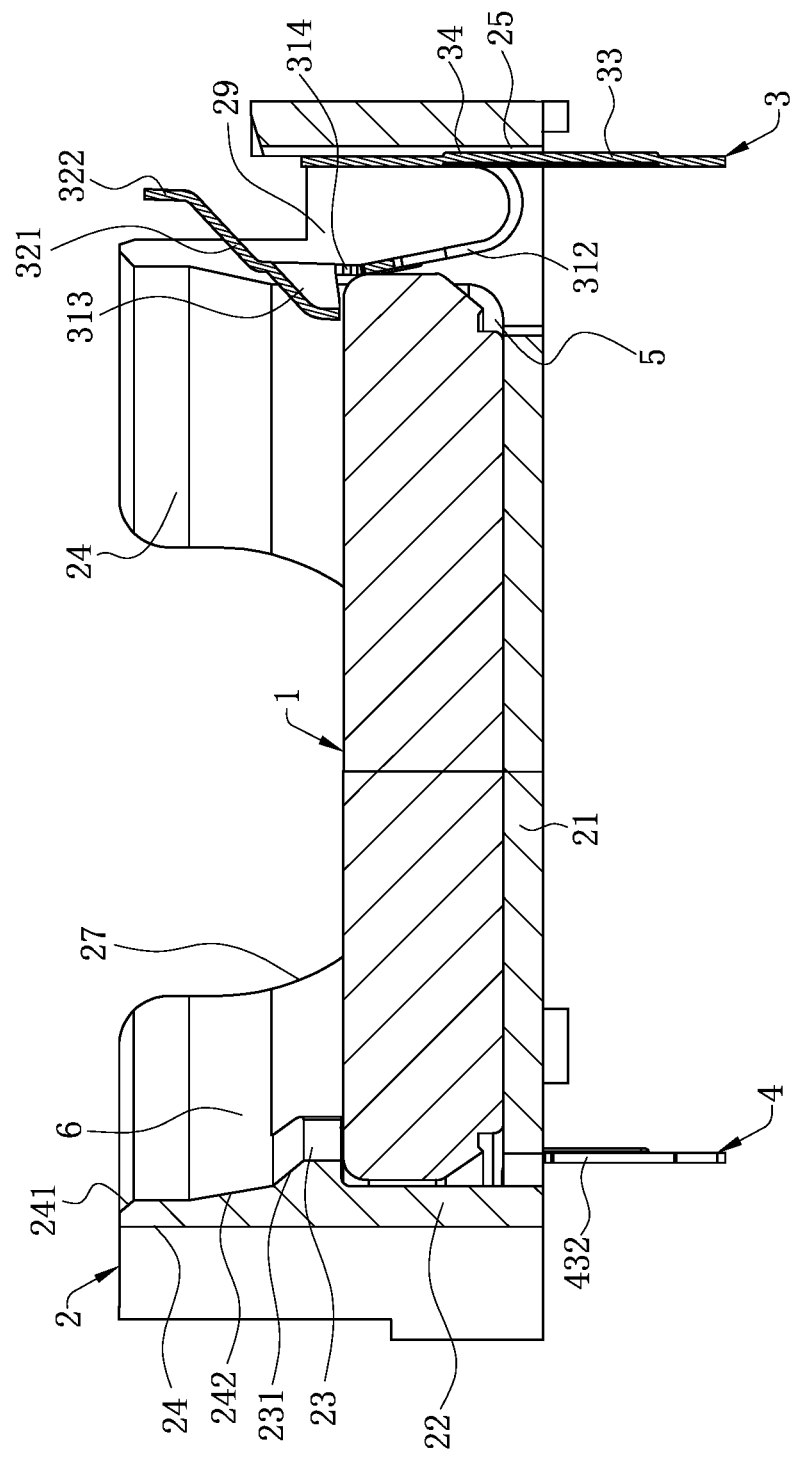
FIG. 7 is a side sectional view of the battery placed in the first accommodating space according to certain embodiments of the present invention.

The battery 1, when being mounted downward into the insulating body 2, has an initial position and a final position. When the battery 1 is guided downward by the second oblique surface 241 and mounted into the second accommodating space 6, as shown in FIG. 4, FIG. 5 and FIG. 6, the battery 1 is located at the initial position, and the battery 1 abuts and is located above the limiting portions 23 and the protruding portion 313 and is in contact with the guide surface 242. Then, the battery 1 is pressed downward such that the battery 1 is guided by the first oblique surface 231 to pass the limiting portions 23 and the protruding portion 313 and enter the first accommodating space 5, as shown in FIG. 7. In this case, the battery 1 is located at the final position, and the battery 1 is located below the limiting portions 23 and the protruding portion 313 to respectively abut the positive pole terminal 3 and the negative pole terminal 4.

To sum up, the battery connector 100 according to certain embodiments of the present invention has the following beneficial effects:

1. The second accommodating space 6 is provided above the first accommodating space 5 and the limiting portions 23 in the insulating body 2, and the second accommodating space 6 is in communication with the first accommodating space 5. In assembly, the battery 1 is firstly guided downward into the second accommodating space 6. Then, the battery 1 is pressed downward to pass the limiting portions 23 and enter the first accommodating space 5, thus abutting the positive pole terminal 3 and the negative pole terminal 4. Thus, in the process of placing the battery 1, even if the battery 1 is not mounted into and aligned with the insulating body 2, the battery 1 will be firstly guided into the second accommodating space 6 in the downward mounting process and located above the limiting portions 23, such that the battery 1 is mounted into the insulating body 2 without being ejected out, thus ensuring the battery 1 is guided by the inner wall surface of the second accommodating space 6 in the subsequent pressing process to smoothly pass the limiting portions 23 and enter the first accommodating space 5 to stably abut the positive pole terminal 3 and the negative pole terminal 4 in the first accommodating space 5, and enhancing the assembly yield rate of the battery connector 100.

2. In assembly, when the battery 1 is in contact with the top portion of each of the stopping walls 24, the second oblique surface 241 may guide the battery 1 to enter the second accommodating space 6 downward. The guide surface 242 may guide the battery 1 to be placed horizontally even if the battery 1 enters the second accommodating space 6 obliquely, allowing the battery 1 to be subsequently pressed to enter the first accommodating space 5. The first oblique surface 231 guides the battery 1 to pass the limiting portions 23 to enter the first accommodating space 5. The guide surface 242, the second oblique surface 241 and the first oblique surface 231 further facilitate assembly of the battery 1 into the insulating body 2.

3. The first notch 26 provides a reserved function, allowing the negative pole terminal 4 to be retained in the second fixing slot 28. The depth of the first notch 26 recessing downward is less than a depth of the second notch 27 recessing downward, such that the stopping walls 24 and the side wall 22 has a larger deformation space. When the battery 1 is placed slightly obliquely in the second accommodating space 6, and the battery 1 is pressed downward, the stopping walls 24 and the side wall 22 may expand outward properly, thus ensuring the battery 1 to be pressed to enter the first accommodating space 5 without breaking the stopping walls 24 and the side wall 22.

4. The two limiting portions 23 are respectively located at the two opposite sides of the negative pole terminal 4 and provided opposite to the protruding portion 313, and the two limiting portions 23 and the protruding portion 313 are located on the same horizontal plane. The two limiting portions 23 and the protruding portion 313 form a triangular shape, and altogether stop three locations of the top end of the battery 1, thereby ensuring the battery 1 not to fall from the first accommodating space 5. Further, the two limiting portions 23 and the protruding portion 313 are located on the same horizontal plane, such that the battery 1 may stably enter the first accommodating space 5 downward, either horizontally or obliquely.

5. The protruding portion 313 is formed by firstly forming a breaking hole 314 on the extending portion 311, and then punching above the breaking hole 314 to form the protruding portion 313 with elasticity. The two opposite side edges of the protruding portion 313 are connected with the extending portion 311 and the bottom end of the protruding portion 313 is a hollow structure. The structural design of the protruding portion 313 allows the protruding portion 313 to return to its original shape rapidly when the battery 1 passes the protruding portion 313 downward and the protruding portion 313 is pressed laterally by the battery 1 and deforms. Further, the bottom end of the protruding portion 313 may match with the limiting portions 23 to stop the top end of the battery 1 altogether.

6. The positive pole terminal 3 includes a pressing portion 32 extending upward and a first section 31 bending downward from the pressing portion 32. The oblique section 321 is partially located in the second accommodating space 6. The oblique section 321 and the guide surface 242 altogether guide the battery 1 to be placed in the second accommodating space 6, and a first section 31 and a second section 34 opposite to each other and forming a U-shaped structure. Since the second section 34 is fixed to the first fixing slot 25, the first section 31 may move in the front-rear direction relative to the second section 34. The first section 31 allows the pressing portion 32 to have certain returning elastic force, such that the positive pole terminal 3 does not easily shake when the battery 1 is ejected out. In addition, the extending height of the second section 34 does not pass beyond the height of the connecting location of the first section 31 and the pressing portion 32, such that the pressing portion 32 has sufficient space to move in the front-rear direction without being abutted.

7. The second soldering leg 43 is located between the two contact arms 42, and has the lateral section 431 and the vertical section 432, allowing the negative pole terminal 4 to be stably inserted in and connected to the insulating body 2. When the battery 1 and the contact arms 42 abut each other, the lateral section 431 abuts the bottom wall 21 to stabilize the negative pole terminal 4, such that the negative pole terminal 4 does not easily shake and become loose to detach from the second fixing slot 28.

8. In addition, the thickness of the battery 1 is less than or equal to the extending height of the stopping walls 24 (that is, the distance between the top surface of each of the limiting portions 23 and the top end of the insulating body 2), ensuring the depth of the second accommodating space 6 to be sufficiently deep, such that the battery 1 does not fall out of the insulating body 2 when the battery 1 is completely mounted into the second accommodating space 6, thereby facilitating automatic assembly of the battery 1, and further enhancing the assembly yield rate of the battery connector 100.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A battery connector, configured to be electrically connected to a battery, the battery connector comprising:
    an insulating body, having a bottom wall, a side wall extending upward from a surrounding periphery of the bottom wall and a plurality of stopping walls formed by extending upward from the side wall, wherein the bottom wall and the side wall form a first accommodating space altogether, the side wall is provided with at least one limiting portion protruding inward, the insulating body has a second accommodating space above the limiting portion, the second accommodating space is enclosed by the stopping walls, and the second accommodating space and the first accommodating space are in communication with each other; and
    a positive pole terminal and a negative pole terminal, respectively fixed to the insulating body and entering the first accommodating space;
    wherein the battery is mounted downward into the second accommodating space and passes the limiting portion to enter the first accommodating space, the battery respectively abuts the positive pole terminal and the negative pole terminal, and the limiting portion stops a top end of the battery to limit the battery from moving upward.

2. The battery connector according to claim 1, wherein the negative pole terminal comprises a mounting portion extending upward and fixed to the side wall, and two contact arms extending toward the first accommodating space from the mounting portion and abutting the battery, a second soldering leg is located between the two contact arms, the second soldering leg comprises a lateral section extending toward the first accommodating space from a surface of the mounting portion and in contact with the bottom wall, and a vertical section bending and extending downward from a tail end of the lateral section and passing through the bottom wall.

3. The battery connector according to claim 1, wherein the positive pole terminal is protrudingly provided with a protruding portion, the protruding portion and the limiting portion are located on a same horizontal plane, and the second accommodating space is located above the protruding portion.

4. The battery connector according to claim 3, wherein the side wall is ring shaped, the side wall is provided with two limiting portions, and the two limiting portions are respectively located at two opposite sides of the negative pole terminal, the two limiting portions are equally distanced from the positive pole terminal and are located on the same horizontal plane with the protruding portion.

5. The battery connector according to claim 3, wherein the positive pole terminal has a abutting portion abutting the battery and an extending portion extending upward from the abutting portion, the protruding portion is formed by punching the extending portion, the protruding portion and an abutting surface of the abutting portion are located at a same side, two opposite side edges of the protruding portion are connected with the extending portion, and a bottom end of the protruding portion limits the battery from moving upward.

6. The battery connector according to claim 5, wherein the bottom end of the protruding portion is a hollow structure, the bottom end of the protruding portion is broken from the extending portion, such that the extending portion forms a breaking hole.

7. The battery connector according to claim 5, wherein the positive pole terminal comprises a pressing portion extending upward from a top end of the extending portion, the pressing portion has an oblique section inclined toward a direction away from the second accommodating space, and an upright section extending upward from the oblique section, and the oblique section is at least partially located in the second accommodating space.

8. The battery connector according to claim 7, wherein the positive pole terminal further comprises a first section and a second section opposite to each other and collectively forming a U-shaped structure, and a first soldering leg formed by tearing from the first section, the first section is provided with the abutting portion and the extending portion, the insulating body is provided with an accommodating hole accommodating the first section, the side wall is provided with a first fixing slot in an inner wall surface of the accommodating hole, the second section is fixed to the first fixing slot, and an extending height of the second section does not pass beyond a height of a connecting location of the extending portion and the oblique section.

9. The battery connector according to claim 1, wherein an inner wall surface of each of the stopping walls is provided with a guide surface extending obliquely downward.

10. The battery connector according to claim 9, wherein a top portion of the limiting portion has a first oblique surface obliquely extending downward, a top portion of each of the stopping walls has a second oblique surface obliquely extending downward toward the second accommodating space, the guide surface is located between the first oblique surface and the second oblique surface, and an inclined angle of the guide surface is greater than an inclined angle of the first oblique surface.

11. The battery connector according to claim 9, wherein the side wall is provided with a second fixing slot to fix the negative pole terminal, a first notch is located above and in communication with the second fixing slot, a second notch is located between two adjacent ones of the stopping walls and extends downward to the side wall, and a depth of the first notch recessing downward is less than a depth of the second notch recessing downward.

12. A battery connector, configured to be electrically connected to a battery, the battery connector comprising:
an insulating body, having a first accommodating space and a second accommodating space located above the first accommodating space, the second accommodating space is enclosed by a plurality of stopping walls, the second accommodating space and the first accommodating space are in communication with each other, at least one limiting portion is provided between the first accommodating space and the second accommodating space, a top portion of the limiting portion is connected to one of the stopping walls, and the stopping walls are located above the limiting portion; and
a positive pole terminal and a negative pole terminal, respectively fixed to the insulating body and entering the first accommodating space;
wherein the battery is mounted downward into the second accommodating space and passes the limiting portion to enter the first accommodating space, the battery respectively abuts the positive pole terminal and the negative pole terminal, and the limiting portion stops a top end of the battery to limit the battery from moving upward.

13. The battery connector according to claim 12, wherein the positive pole terminal has a protruding portion extending inward, the protruding portion and the limiting portion are located on a same horizontal plane, and the second accommodating space is located above the protruding portion.

14. The battery connector according to claim 12, wherein the positive pole terminal and the negative pole terminal are provided opposite to each other, the side wall is provided with two limiting portions, the positive pole terminal has a abutting portion abutting the battery and an extending portion extending upward from the abutting portion, a protruding portion is formed by punching the extending portion, the protruding portion and an abutting surface of the abutting portion are located at a same side, two opposite side edges of the protruding portion are connected with the extending portion, and the two limiting portions are respectively located at two opposite sides of the negative pole terminal and are located on the same horizontal plane with the protruding portion.

15. The battery connector according to claim 12, wherein the insulating body has a bottom wall and a side wall extending upward from a surrounding periphery of the bottom wall, the bottom wall and the side wall form the first accommodating space altogether, and the limiting portion is provided to protrude inward from the side wall.

16. The battery connector according to claim 15, wherein an inner wall surface of each of the stopping walls is provided with a guide surface extending obliquely downward.

17. A battery connector, configured to be electrically connected to a battery, the battery connector comprising:
an insulating body, having a first accommodating space, wherein a side wall surface of the first accommodating space is provided with at least one limiting portion protruding inward; and
a positive pole terminal and a negative pole terminal, respectively fixed to the insulating body and entering the first accommodating space;
wherein a thickness of the battery is less than a distance between a bottom surface of the limiting portion and a top end of the insulating body, the battery is mounted downward into the insulating body and has an initial position and a final position, when the battery is located at the initial position, the battery is located above the limiting portion, when the battery is located at the final position, the battery is located below the limiting portion to respectively abut the positive pole terminal and the negative pole terminal, and the limiting portion stops a top end of the battery;
wherein the insulating body has a bottom wall and a side wall extending upward from a surrounding periphery of the bottom wall, the bottom wall and the side wall form the first accommodating space altogether, the insulating body has a second accommodating space above the limiting portion, the second accommodating space is enclosed by a plurality of stopping walls, the stopping walls are formed by extending upward from the side wall, and when the battery is located at the initial position, the battery is accommodated in the second accommodating space.

18. The battery connector according to claim 17, wherein when the battery is located at the initial position, the stopping walls and at least one side of the battery are in contact with each other.

19. The battery connector according to claim 17, wherein the positive pole terminal and the negative pole terminal are provided opposite to each other, the side wall is provided with two limiting portions, the positive pole terminal has a abutting portion abutting the battery and an extending portion extending upward from the abutting portion, a protruding portion is formed by punching the extending portion, the protruding portion and an abutting surface of the abutting portion are located at a same side, two opposite side edges of the protruding portion are connected with the extending portion, and the two limiting portions are respectively located at two opposite sides of the negative pole terminal and are located on the same horizontal plane with the protruding portion.

* * * * *